US012572225B1

(12) United States Patent　　　(10) Patent No.:　　US 12,572,225 B1
Spackman et al.　　　　　　　　　 (45) Date of Patent:　　　Mar. 10, 2026

(54) WIRELESS EARBUD CASE WITH MOUSE FUNCTIONALITIES

(71) Applicant: Nathan Jared Spackman, Kaysville, UT (US)

(72) Inventors: Nathan Jared Spackman, Kaysville, UT (US); Scott Duane Snider, Roy, UT (US)

(73) Assignee: Nathan Jared Spackman, Kaysville, UT (US)

( * ) Notice: Subject to any disclaimer, the term of this patent is extended or adjusted under 35 U.S.C. 154(b) by 0 days.

(21) Appl. No.: 18/954,413

(22) Filed: Nov. 20, 2024

(51) Int. Cl.
　　*G06F 3/0354*　　　(2013.01)
　　*G06F 3/039*　　　　(2013.01)
　　*G06F 3/0485*　　　(2022.01)
　　*G06F 3/0487*　　　(2013.01)
　　*H04R 1/02*　　　　(2006.01)
　　*G06F 3/044*　　　　(2006.01)

(52) U.S. Cl.
　　CPC ...... *G06F 3/03543* (2013.01); *G06F 3/03547* (2013.01); *G06F 3/039* (2013.01); *G06F 3/0485* (2013.01); *G06F 3/0487* (2013.01); *H04R 1/02* (2013.01); *G06F 3/0448* (2019.05); *G06F 2203/0384* (2013.01)

(58) Field of Classification Search
　　CPC .. G06F 3/03543; G06F 3/03547; G06F 3/039; G06F 3/0485; G06F 3/0487; G06F 3/0448; G06F 2203/0384; H04R 1/02
　　See application file for complete search history.

(56) References Cited

U.S. PATENT DOCUMENTS

| | | | | |
|---|---|---|---|---|
| 9,748,998 | B2 * | 8/2017 | Gronewoller | ......... H02J 7/0042 |
| 2005/0162394 | A1 * | 7/2005 | Chiu | ...................... G06F 1/3259 |
| | | | | 345/166 |
| 2013/0127719 | A1 * | 5/2013 | Yasutake | ............. G06F 3/03543 |
| | | | | 345/163 |
| 2013/0238829 | A1 * | 9/2013 | Laycock | ............... H04R 1/1033 |
| | | | | 710/303 |
| 2017/0339482 | A1 * | 11/2017 | Schrems | ................. H02J 50/10 |
| 2021/0112672 | A1 * | 4/2021 | Cazalet | ................ A45C 11/001 |
| 2021/0185424 | A1 * | 6/2021 | Kowalk | ................... H02J 50/20 |
| 2023/0328419 | A1 * | 10/2023 | Karp | .................... H04R 1/1016 |
| | | | | 381/380 |

* cited by examiner

*Primary Examiner* — Jonathan A Boyd
(74) *Attorney, Agent, or Firm* — Lowenstein Sandler LLP

(57)　　　　　　　　ABSTRACT

An earbud case with the functionalities of a wireless computer mouse. The earbud case may include a compliant lid having a curved surface having ergonomics of a computer mouse. The earbud case may also include a body having a curved top and a flat bottom, wherein the body is divided into a first portion and a second portion located on the curved top. The first portion may include a first chamber and second chamber having electrical contacts connected to a power management sub-system, the power management sub-system to charge a first earbud when placed in the first chamber and a second earbud when placed in the second chamber. The second portion may include a first and a second mouse button. The first and second mouse buttons may be activated by compression of the compliant lid in areas above the first and second mouse buttons.

20 Claims, 9 Drawing Sheets

100

600

WIRELESS EARBUD CASE WITH MOUSE FUNCTIONALITIES

TECHNICAL FIELD

The instant specification generally relates to wireless peripheral devices. More specifically, the instant specification relates to an earbud case that has computer mouse functionalities.

BACKGROUND

Wireless peripheral devices (e.g., wireless earbuds, wireless computer mouses, wireless speakers, etc.) have become increasingly popular due to their convenience and portability. The increased portability provided by wireless peripherals devices has encouraged users to transport their wireless peripheral devices between their different workspaces, e.g. home offices, work offices, school, etc. Transporting peripherals between workspaces can leave users vulnerable to mistakenly leaving their devices in one workspace or the other. Wireless peripheral devices can be easily forgotten due to the number of peripheral devices a user needs to keep track of and due to the size of the peripheral devices being small, as in the case of wireless earbuds.

Others have tried to address these issues by adding compartments to one wireless peripheral device that allows for the storage of additional wireless peripheral devices, allowing a user to keep track of fewer devices. For example, others have developed computer mouse peripherals with earbud chambers at the bottom of the mouse that allows a user to store their earbuds and charge them. Other attempts include computer mouse peripherals with a compartment on the side that can house retractable or wireless earbuds. While these examples help users by reducing the number of devices they need to keep track of, these examples still pose additional disadvantages such as creating difficulty for the user to retrieve their earbuds by storing the earbuds on the bottom of the mouse or storing them on the side of the device.

BRIEF DESCRIPTION OF THE DRA WINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
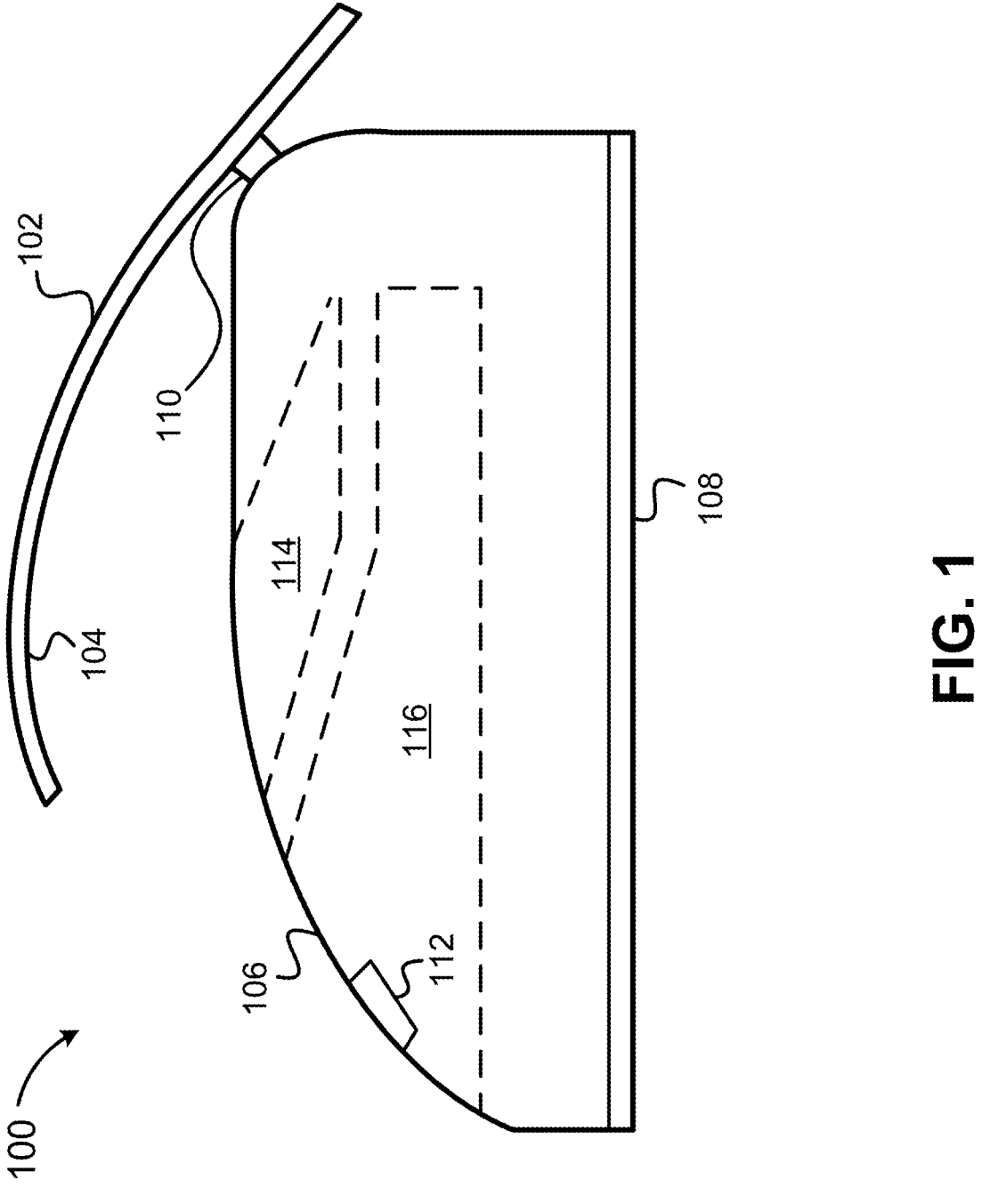
FIG. 1 is a perspective side view of an example embodiment of an earbud case by which selected aspects of the present disclosure may be implemented, in accordance with various embodiments.

Existing peripheral devices that include compartments for storing other peripheral devices pose accessibility challenges to the user. For example, when a compartment for storing earbuds is located on the bottom or located on the side of a computer mouse peripheral, the user is required to lift and rotate the mouse in one hand and retrieve the stored earbuds with the other hand. This can cause stress for users when they need to quickly access their earbuds and continue using the computer mouse (i.e. to accept a call or join a video conference). Moving the earbud storage compartment to more accessible locations on the previous solutions, such as the top of the computer mouse, has been avoided as placing the compartments on top of the computer mouse interferes with the user's grip on the device while using the computer mouse functionalities.

Additionally, the space taken up by adding storage compartments limits the space available for common computer mouse components such as scroll wheels. Other solutions have reduced the size of computer mouse electronics by substituting scroll wheels with "smart" substrates that incorporate capacitive touch sensors into the top surface of the mouse and eliminate the need for scroll wheels. However, these "smart" substrates are expensive to manufacture and can be damaged or scratched while being transported inside a user's pocket, backpack, or bag with other loose items.

Aspects and implementations of the present disclosure address the above deficiencies, among others, by providing an earbud case that integrates the functionalities of a computer mouse while storing earbuds on the top surface of the earbud case without affecting the user's grip on the earbud case. Additionally, the earbud case eliminates the need to replace a scroll wheel with an expensive substrate by implementing capacitive touch sensing while using cheap, durable materials for the surface of the mouse that contain no active electronics.

An earbud case is disclosed. The earbud case may include a body having a curved top surface and a flat bottom. The curved top surface may include a portion configured to receive a pair of earbuds. The portion may charge the pair of earbuds when the earbuds are placed in the first portion. The earbud case may also include a lid having a curved surface having the ergonomics of a computer mouse. The lid may slide along a slot formed on the body of the earbud case in a first direction to an open position exposing the curved top surface. The lid may also slide along the slot in a second direction to a closed position covering the curved top surface.

An earbud system is also disclosed. The earbud system may include an earbud case, a first earbud, and a second earbud. The earbud case may include a battery. The earbud case may include a circuit board having a power management sub-system coupled to the battery, a processing device; and a wireless communications component. The earbud case may also include a body with a curved top surface and a flat bottom. The curved top surface may include a portion configured to receive the first earbud and the second earbud. The first earbud and second earbud may be charged by the power management sub-system when placed in the portion. The earbud case may also include a lid having a curved surface having ergonomics of a computer mouse. The lid may slide along a slot formed on the body of the earbud case in a first direction to an open position to expose the curved top surface. The lid may slide along the slot in a second direction to a closed position to cover the curved top surface.

Another embodiment of an earbud case is also disclosed. The earbud case may include a battery, a circuit board that includes a power management sub-system coupled to the battery, and a processing device. The earbud case may also contain a wireless communications component. The earbud case may include a compliant lid having a curved surface having ergonomics of a computer mouse. The earbud case may further include a body having a curved top and a flat bottom, where the body is divided into a first portion and a second portion located on the curved top. The first portion may include a first and a second chamber having electrical contacts coupled to the power management sub-system to charge a first or second earbud when placed in the first or second chamber. The second portion may extend beneath the first portion. The second portion may include a first and second mouse button where the first or second mouse button may be activated by compression of the compliant lid and a corresponding compliant area of the curved top in a first or second area of the compliant lid above the first or second mouse buttons. The second portion may also include a touch panel, the touch panel being activated by the presence of a conductive object in a third area of the compliant lid and a corresponding third area of the curved top above the touch panel.

Figure 2:
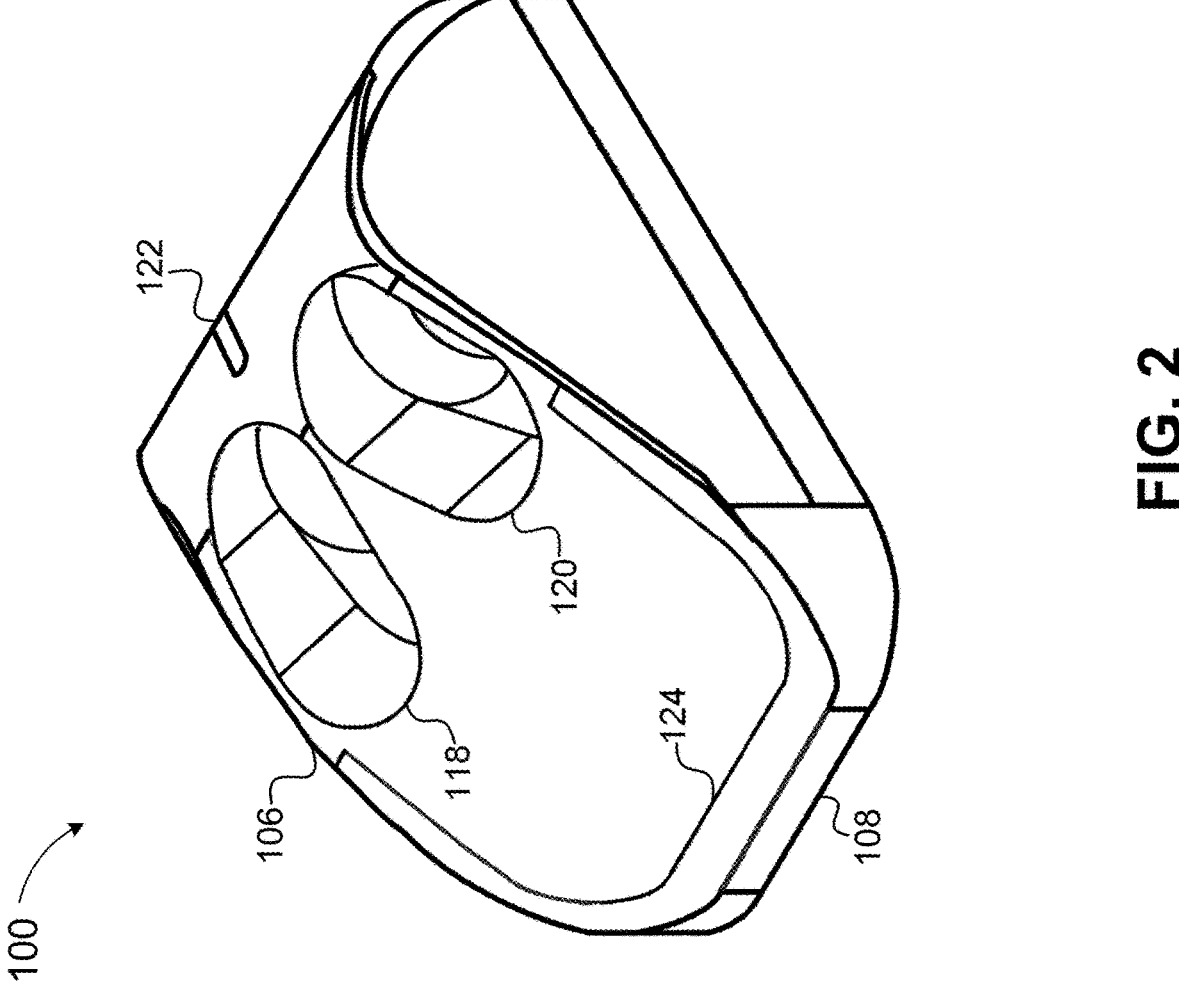
FIG. 2 is a perspective view of the example embodiment of the earbud case of FIG. 1 with the compliant lid removed, in accordance with various embodiments.

FIG. 1 depicts an example embodiment of an earbud case 100 with a compliant lid 102 in a semi-open position. The compliant lid 102 may include a curved surface 104 having the ergonomics of a computer mouse. The earbud case 100 may include a body having a curved top 106 and a flat bottom 108. The compliant lid 102 may selectably couple to the body of the earbud case 100 by a guide 110 inserted into a slot 122 formed on the curved top 106 as depicted in FIG. 2. The compliant lid 102 may slide along the slot 122 and rotate away from the curved top 106 to allow access to the curved top 106. The compliant lid 102 may also include an embedded lid magnet 126 depicted in FIG. 3A that magnetically couples to an embedded body magnet 112 in the curved top 106 to hold the compliant lid 102 in a closed position while the earbud case is transported or while the earbud case is used as a mouse. The compliant lid 102 may snap to the curved top 106 or may selectably couple to the curved top 106 in some other way.

In some implementations, the body of the earbud case 100 may include a first portion 114 located on the curved top 106. The first portion 114 may be positioned at an angle from the curved top 106 to simplify access to the first portion 114 when the compliant lid 102 is in an open position. The body of the earbud case 100 may also include a second portion 116 located on the curved top 106 that also extends beneath the first portion 114. The second portion 116 may enclose a battery (not depicted). The battery can be a rechargeable battery. The battery may be a Lithium-Ion (Li-ion) battery. The battery may be a disposable battery. The second portion 116 may enclose a circuit board such as the circuit board 500 shown in FIG. 5. The second portion 116 may enclose a printed circuit board (PCB) such as the PCB 600 shown in FIG. 6. The second portion may also enclose a touch panel such as the touch panel 510 depicted in FIG. 5. The body of the earbud case 100 may contain all the active electronic components for the earbud case 100, e.g., the touch panel 510, the processing device 502, and the wireless communications component 504, or other components on circuit board 500 or PCB 600. The second portion may contain all the active electronic components for the earbud case 100.

FIG. 2 depicts an example embodiment of the earbud case 100 of FIG. 1A with the compliant lid 102 removed. In some implementations, the first portion 114 may contain a first chamber 118 and a second chamber 120. The first chamber 118 may have electrical contacts, such as the electrical contacts 130 depicted in FIG. 4A, coupled to a power management subsystem, such as the power management subsystem 522 shown in FIG. 5, to charge a first earbud (not depicted) when placed in the first chamber 118. The first chamber 118 may extend into the curved top 106 to prevent the first earbud from protruding out the top of the first chamber 118, allowing the compliant lid 102 to rest flush against the curved top 106 when the compliant lid 102 is in a closed position. The second chamber 120 may also have electrical contacts, such as the electrical contacts 130 depicted in FIG. 4A, coupled to a power management subsystem, such as the power management subsystem 522 shown in FIG. 5, to charge a second earbud (not depicted) when placed in the second chamber 120. The second chamber 120 may extend into the curved top 106 to prevent the second earbud from protruding out the top of the second chamber 120, allowing the compliant lid 102 to rest flush against the curved top 106 when the compliant lid 102 is in a closed position. The first chamber 118 and the second chamber 120 may include magnets (not depicted) to hold the first and second earbuds in place for charging.

In some implementations, the curved top 106 may be formed to include a slot 122 that houses the guide 110 to provide a track for the guide 110 to slide along and allow the compliant lid 102 to slide open or to slide closed. The curved top 106 may couple to the flat bottom 108 leaving no gaps to prevent contaminants from entering the second portion 116. The curved top 106 may be comprised of a compliant material with a first compliance that allows the curved top 106 to travel when compressed. The curved top 106 may couple to the flat bottom 108 by a compliant region 124. The compliant region 124 may be made of a compliant material with a second compliance that is greater than the first compliance of the material of the curved top 106 to allow for travel when the curved top 106 is compressed. The curved top 106 may be made of a material having a first thickness and the compliant region 124 may be made of the same material as the curved top 106 having a second thickness, where the second thickness is less than the first thickness. The compliant region 124 may be made of a non-rigid adhesive such as, glue, epoxy, or the like. The curved top 106 may optionally leave a gap in place of the compliant region 124 between the curved top 106 and the flat bottom 108 to leave additional room for the curved top 106 to travel when compressed.

Figure 3A:
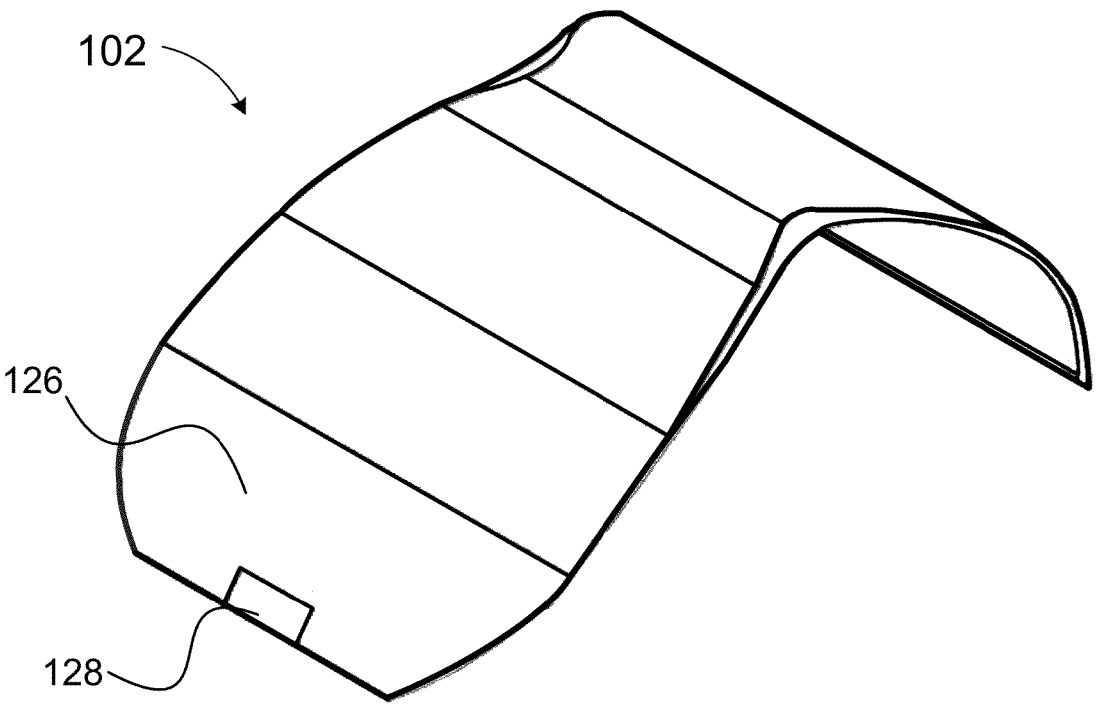
FIG. 3A is a perspective view of an example embodiment of a compliant lid for use with an earbud, in accordance with various embodiments.

FIG. 3A depicts an example embodiment of the compliant lid 102 of the earbud case 100 of FIG. 1. The compliant lid 102 may include an embedded lid magnet 126. The embedded lid magnet 126 may overlap with an embedded body magnet 112 when the compliant lid 102 is in a closed position. The embedded lid magnet 126 and the embedded body magnet 112 may each have an associated polarity. The embedded lid magnet 126 may have an associated polarity that is opposite from the embedded body magnet 112 allowing the embedded lid magnet 126 to be attracted to the embedded body magnet 112 and maintain the lid in a closed position while the earbud case is transported. One of the embedded body magnet 112 or the embedded lid magnet 126 may be substituted with an embedded piece of metal that is attracted to magnetic forces. The compliant lid 102 may rest flush with the curved top 106 and prevent the first and second earbuds from falling out of the first chamber 118 and the second chamber 120 when the earbud case 100 is transported or used as a mouse.

The compliant lid 102 may also form a charging port slot 128 that allows a charging cord to be plugged into the earbud case 100 through the compliant lid 102. The compliant lid 102 may be configured to contain no active electronics.

Figure 3B:
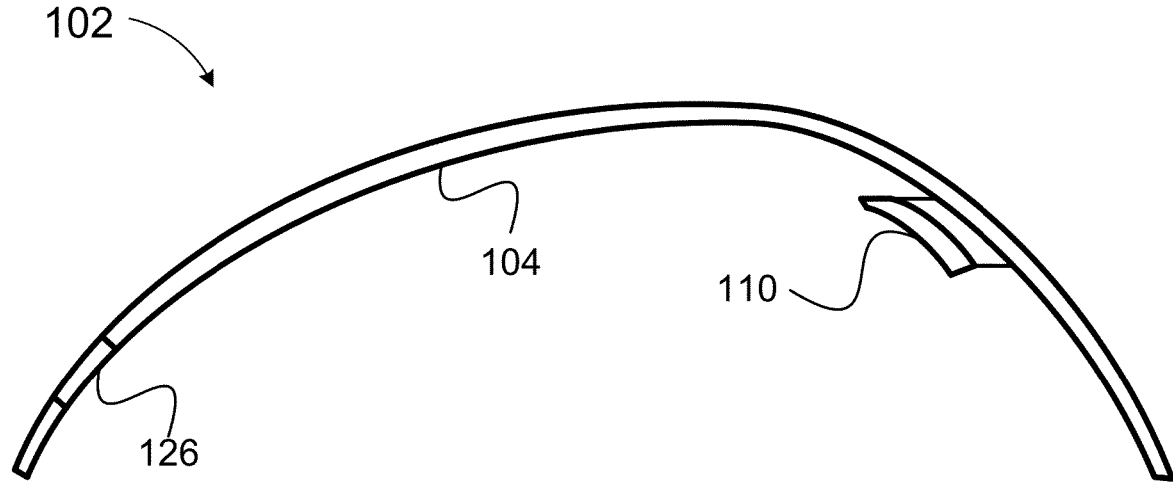
FIG. 3B is a perspective side view of the example embodiment of the compliant lid of FIG. 3A, in accordance with various embodiments.

FIG. 3B depicts an example embodiment of the compliant lid 102 of the earbud case 100 of FIG. 1. The view of FIG. 3B depicts components not seen in FIG. 3A. The compliant lid 102 may include a guide 110 that removably inserts into the slot 122. The guide 110 may slide along the slot 122 to move the compliant lid to an open or closed position. The guide 110 may be a slide joint. The guide 110 may include wheels or bearings to facilitate sliding motions. The guide 110 may permanently insert into the slot 122.

Figures 4A, 4B:
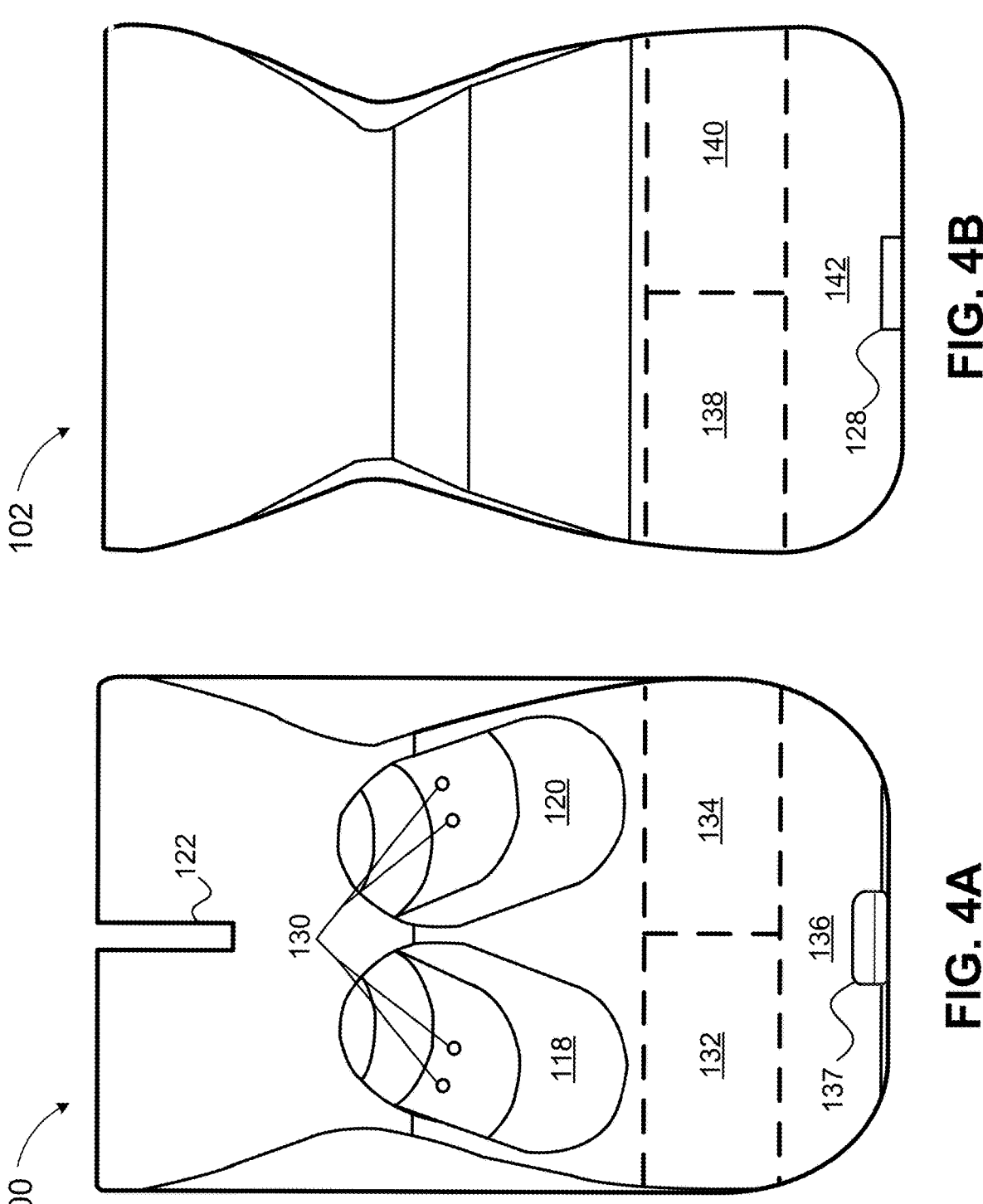
FIG. 4A is a perspective top view of the example embodiment of the earbud case of FIG. 1 with the compliant lid removed, in accordance with various embodiments.
FIG. 4B is a perspective top view of the example embodiment of the compliant lid of FIG. 3A, in accordance with various embodiments.
Figure 7:
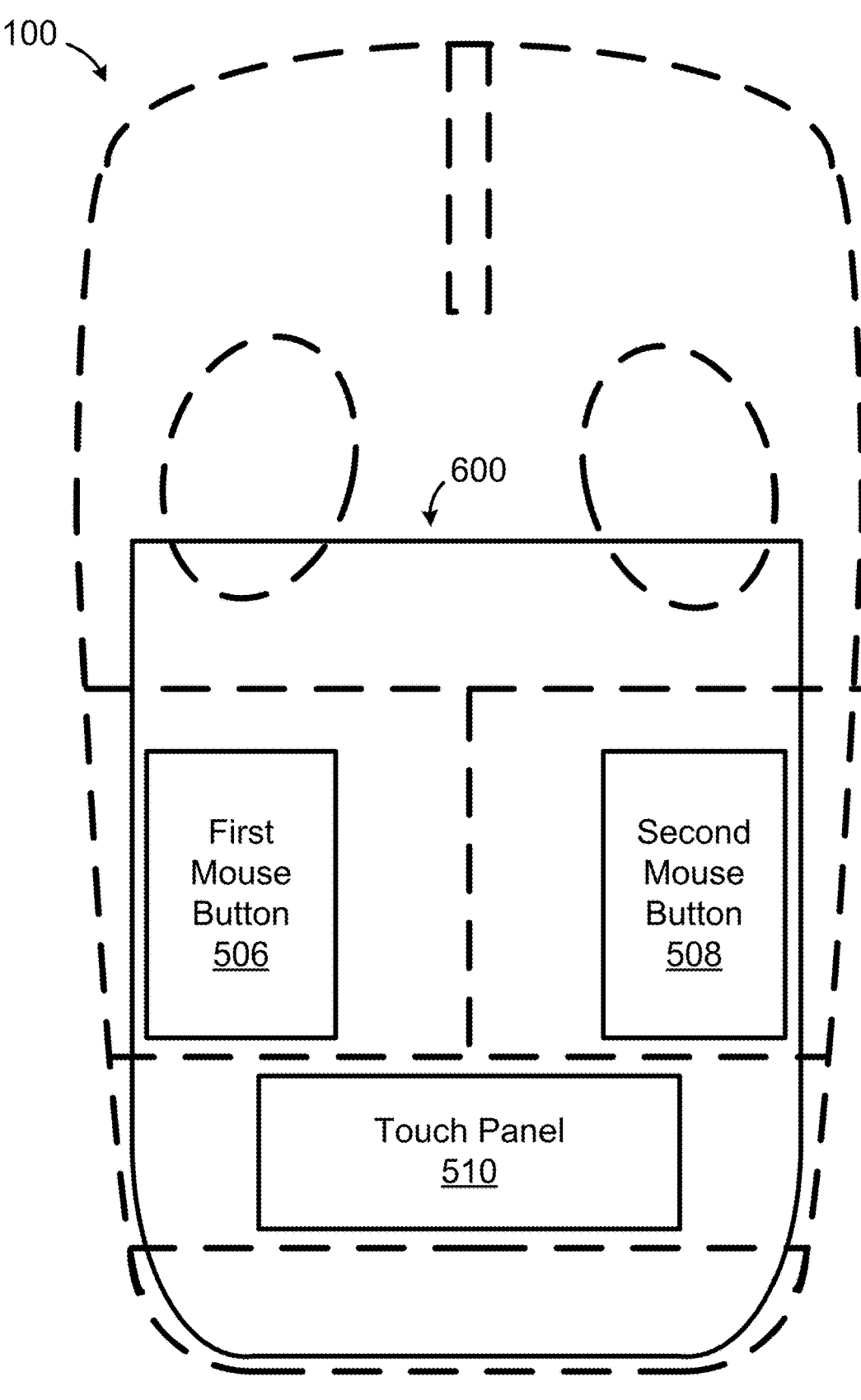
FIG. 7 is a perspective top view of an example embodiment of an earbud case assembly by which the example embodiment PCB of FIG. 6 is shown in relation to the example embodiment of the earbud case of FIG. 4A, in accordance with various embodiments.

FIG. 4A depicts an example embodiment of the earbud case 100 of FIG. 1 with the compliant lid removed. In some implementations, the curved top 106 may include a first compliant area 132 located above the first mouse button 506 as depicted in FIG. 7. The first compliant area 132 may correspond to the first area 138 of the compliant lid 102. The first compliant area 132 may include visual indicators outlining the first compliant area 132 shown with the dashed lines in FIG. 4A. The first compliant area 132 may have no visual indicators outlining the first compliant area 132. When the curved top 106 is compressed in the first compliant area 132, the first mouse button 506 may be activated. The curved top 106 may also include a second compliant area 134 located above the second mouse button 508 as depicted in FIG. 7. The second compliant area 134 may correspond to the second area 140 of the compliant lid. The second compliant area 134 may have visual indicators outlining the second compliant area 134 shown with the dashed lines in FIG. 4A. The second compliant area 134 may have no visual indicators outlining the second compliant area 134. When the curved top 106 is compressed in the second compliant area 134, the second mouse button 508 may be activated.

The curved top 106 may include a third area 136 located above the touch panel 510 as depicted in FIG. 7. The touch panel 510 may be activated by detecting the presence of a conductive object, such as a finger or a stylus, in the third area 136. The third area 136 may have visual indicators outlining the third area 136 shown with the dashed lines in FIG. 4A. The third area 136 may overlap with the first compliant area 132 and the second compliant area 134. The third area 136 may occupy the area in between the first compliant area 132 and the second compliant area 134. The third area 136 may extend to the compliant region 124 where the curved top 106 couples to the flat bottom 108.

Figure 5:
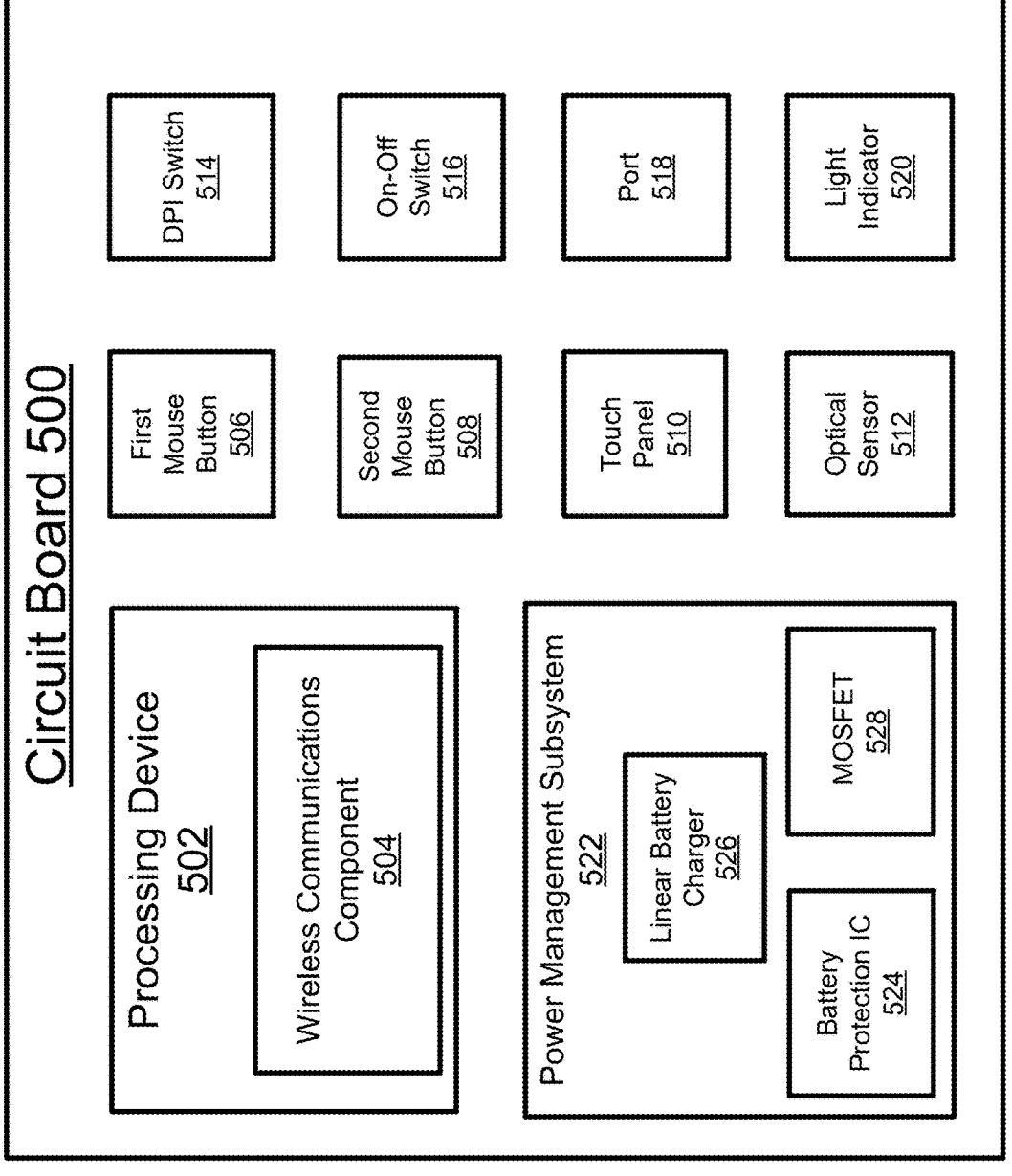
FIG. 5 is a schematic block diagram illustrating an example embodiment of a circuit for use in an earbud case by which selected aspects of the present disclosure may be implemented, in accordance with various embodiments.

The curved top 106 may also be formed to include a charging slot 137 allowing for a charging cord to be inserted into the port 518 depicted in FIG. 5 through the curved top 106. The charging slot 137 may accommodate a Universal Serial Bus (USB) Type-C(USB-C) charging cord or similar. The charging slot 137 may align with the charging port slot 128 allowing the charging cord to be inserted through both the compliant lid 102 and the curved top 106.

FIG. 4B depicts an example embodiment of the compliant lid 102 of FIG. 2. In some implementations, the compliant lid 102 may include a first area 138. The first area 138 may have visual indicators outlining the first area 138 as shown with the dashed lines in FIG. 4B. The first area 138 may have no visual indicators outlining the first area 138. The first area 138 may overlap with the first compliant area 132 of the curved top 106 shown in FIG. 4A when the compliant lid is in a closed position. The first area 138 may cover a larger area than the first compliant area 132 of the curved top 106. The first area 138 may cover a smaller area than the first compliant area 132 of the curved top 106. The first area 138 may cover the same area as the first compliant area 132 of the curved top 106. The first area 138 of the compliant lid 102 and the first compliant area 132 of the curved top 106 may be positioned over the first mouse button 506 when the compliant lid 102 is in a closed position. When the compliant lid 102 is in a closed position, the first mouse button 506 may be activated by compressing the compliant lid 102 in the first area 138 which in turn compresses the curved top 106 in the first compliant area 132. When the compliant lid 102 is in an open position, the first mouse button 506 may be activated by compressing the curved top 106 in the first compliant area 132.

The compliant lid 102 may include a second area 140. The second area 140 may have visual indicators outlining the second area 140 as shown with the dashed lines in FIG. 4B. The second area 140 may have no visual indicators outlining the second area 140. The second area 140 may overlap with the second compliant area 134 of the curved top 106 shown in FIG. 4A when the compliant lid is in a closed position. The second area 140 may cover a larger area than the second compliant area 134 of the curved top 106. The second area 140 may cover a smaller area than the second compliant area 134 of the curved top 106. The second area 140 may cover the same area as the second compliant area 134 of the curved top 106. The second area 140 of the compliant lid 102 and the second compliant area 134 of the curved top 106 may be positioned over the second mouse button 508 when the compliant lid 102 is in a closed position. When the compliant lid 102 is in a closed position, the second mouse button 508 may be activated by compressing the compliant lid 102 in the second area 140 which in turn compresses the curved top 106 in the second compliant area 134. When the compliant lid 102 is in an open position, the second mouse button 508 may be activated by compressing the curved top 106 in the second compliant area 134.

The compliant lid 102 may include a touch panel area 142. The touch panel area 142 may have visual indicators outlining the touch panel area 142 as shown in FIG. 4B. The touch panel area 142 may have no visual indicators outlining the touch panel area 142. The touch panel area 142 may overlap with the first area 138 and the second area 140. The touch panel area 142 may be positioned between the first area 138 and the second area 140. The touch panel area 142 may cover the same area as the third area 136 when the compliant lid is in a closed position. The touch panel area 142 may cover a smaller area than the third area 136. The touch panel area 142 may cover a larger area than the third area 136. The touch panel area 142 and the third area 136 may be positioned over the touch panel 510 when the compliant lid 102 is in a closed position. When the compliant lid 102 is in a closed position, the touch panel 510 may be activated by the presence of a conductive object, such as a finger or a stylus, detected by the touch panel 510 in the touch panel area 142 and the third area 136 of the curved top 106. When the compliant lid 102 is in an open position, the touch panel 510 may be activated by detecting the presence of a conductive object in the third area 136 of the curved top 106.

FIG. 5 depicts an example block schematic of a circuit board 500. The circuit board 500 may be housed in the second portion 116 of the earbud case 100. The circuit board 500 may include a processing device 502. The processing device 502 may be a processor such as a microcontroller, a system on a chip (SOC) or the like. The processing device 502 may include a wireless communications component 504 built into the processing device 502. The wireless communications component 504 may be an onboard printed circuit board (PCB) antenna. The wireless communications component 504 may be a separate component from the processing device 502 and be electrically coupled to the processing device 502.

The processing device 502 may be programmed to support communication protocols such as Bluetooth, Bluetooth Low Energy (BLE), or Wi-Fi and communicate wireless communications through the wireless communications component 504. The processing device 502 may be programmed to communicatively couple or "pair" the earbud case 100 to a host device (not depicted) such as a laptop, a desktop computer, a smartphone, etc., using the wireless communications component 504. The processing device 502 may be programmed to transmit wireless communications from the earbud case 100 to a host device by the wireless communications component 504 and receive wireless communications sent from the host device to be received by the earbud case 100 through the wireless communications component 504.

The processing device 502 may be programmed to transmit wireless communications communicating mouse functions performed by the earbud case 100 to be performed by a cursor on a screen of the host device by the wireless communications component 504. Mouse functions that may be communicated to the host device may include scroll commands, left click commands, right click commands, or slide commands. Scroll commands may include a command to scroll contents of a window on the screen of the host device up and down or left and right corresponding to the movement of a conductive object activating the touch panel 510. Left click commands may include selecting an object, such as a graphic or link, on the screen of the host device with a cursor in response to the first mouse button 506 being activated. Right click commands may include opening an options menu on the screen of the host device with a cursor in response to the second mouse button 508 being activated. Slide commands may include moving a cursor on the screen of the host device in a direction of movement corresponding to a direction of movement of the earbud case 100. The processing device 502 may receive wireless communications by the wireless communications component 504 from the host device communicating earbud case functions to be performed by the earbud case 100 and the first and second earbuds (not depicted) to the earbud case 100. The earbud case functions to be performed by the earbud case 100 and the first and second earbuds may include functions such as receiving audio data for the first or second earbuds to transmit through speakers in the earbuds, accepting a call, hanging up a call, etc. The processing device 502 may be programmed to permit mouse functions and earbud case functions to be performed simultaneously.

The processing device 502 may also be programmed to enter a low-power mode if the mouse functionalities of the earbud case 100 have not been utilized within a predetermined period of time (e.g., 30 seconds). The processing device 502 may be programmed to enter the low-power mode if the first mouse button 506, the second mouse button 508, or the touch panel 510 have not been activated for the predetermined period of time. The processing device 502 may be programmed to enter the low-power mode if the earbud case 100 has not been moved for the predetermined period of time. The low-power mode may be a battery saving mode where the processing device 502 is programmed to turn mouse functionalities off, i.e. slide commands not being sent in response to the earbud case 100 being moved or the like. The processing device 502 may be programmed to exit the low-power mode if an activation action is taken. The activation action may be activating the first or second mouse buttons or the like.

The circuit board 500 may include a first mouse button 506 and a second mouse button 508. The first mouse button 506 and the second mouse button 508 may be an actuator such as snap action switches, push buttons, or the like. The first mouse button 506 and the second mouse buttons 508 may both be the same kind of actuator, i.e. both snap action switches, or may be different types of actuators, i.e. the first mouse button 506 is a snap action switch and the second mouse button 508 is a push button. The first mouse button 506 may be positioned on the left side of the earbud case 100 as depicted in FIG. 7, and, when activated, may transmit a signal to the processing device 502 that corresponds to a left click command. The second mouse button 508 may be positioned on the right side of the earbud case 100 as depicted in FIG. 7, and, when activated, may transmit a signal to the processing device 502 that corresponds to a right click command.

The circuit board 500 may include a touch panel 510. The touch panel 510 may include multiple electrodes electrically coupled together. The multiple electrodes may be capacitors. The touch panel 510 may include a single capacitive touch sensor. The touch panel 510 may include multiple capacitive touch sensors. The touch panel 510 may track the motion of a conductive object moving along one directional axis, such as up and down or along a y-axis. The touch panel 510 may track the motion of a conductive object moving along more than one directional axes, such as up and down and left and right or along a y-axis and an x-axis. The touch panel, when activated, may transmit a signal to the processing device 502 that corresponds to a scroll command.

The circuit board 500 may include an optical sensor 512. The optical sensor 512 may track a direction of movement of the earbud case 100 and translate the movement to instructions to transmit to the processing device 502 that corresponds to a slide command to move the cursor in the direction of movement of the earbud case 100 on the screen of a host device. The sensitivity of the optical sensor 206 may be adjusted by selections made with a dots per inch (DPI) switch, such as the DPI switch 514. The DPI switch 514 may be a slide switch, a push button, or a similar actuator. The DPI switch 514 may allow a user to adjust the sensitivity level of the optical sensor 512 to a higher sensitivity level or a lower sensitivity level. A higher sensitivity levels requires the earbud case 100 to be moved a shorter distance in order for the optical sensor 512 to transmit a signal to the processing device 502 to send a slide command to the host device. A lower sensitivity level requires the earbud case 100 to be moved a longer distance in order for the optical sensor 512 to transmit a signal to the processing device 502 to send a slide command to the host device.

Figure 8:
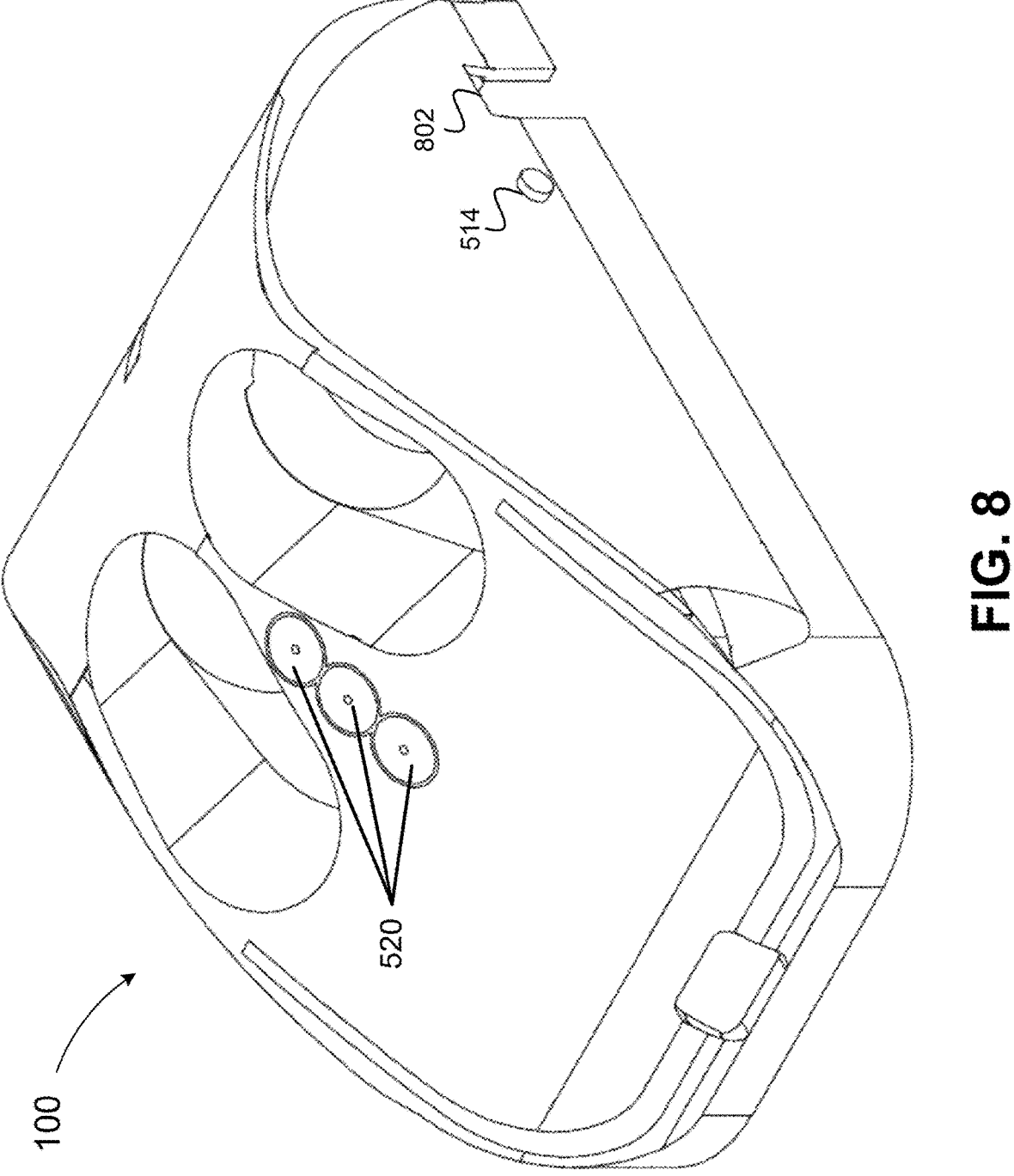
FIG. 8 is a perspective view of an example embodiment of an earbud case in accordance with various embodiments.

The circuit board 500 may include an on-off switch 516 configured to switch the earbud case 100 on or off. The on-off switch 516 may be a slide switch. The on-off switch 516 may be a push button or the like. The on-off switch 516 may turn off mouse functionalities when switched to off and allow the first and second earbuds to continue charging. The on-off switch 516 may turn off both the earbud case functionalities and the mouse functionalities. The on-off switch 516 may be located on the side of the earbud case and protrude through an on-off slot 802 formed on the side of the earbud case 100 as shown in FIG. 8.

In some implementations, the circuit board 500 may include a port 518. The port 518 may include a power charging port, a data connection port, or some other type of port. The port 518 may provide an interface between the earbud case 100 and some other device or a power source. The port 518 may be connectable to a cable. The cable may supply power to the earbud case 100 to charge the battery. The cable may transmit data to the earbud case 100 and transmit data from the earbud case 100. In one implementation, the port 518 may include a Universal Serial Bus (USB) port (e.g., a USB-C port, a USB-Mini B port, a USB-Micro B port, or some other type of USB port) or some other type of charging or data connection port. In some embodiments, the port 518 may include a port cover. The port 518 may be coupled to the power management subsystem 522 where the port is used to connect to a power source to charge the battery.

In some implementations, the circuit board 500 may include one or more light indicators 520. The one or more light indicators 520 may include a light assembly configured to emit light to indicate information about the earbud case 100. The one or more light indicators 520 may include a light-emitting diode (LED) or some other lighting device. The one or more light indicators 520 may indicate whether the earbud case 100 is on, a battery level of the earbud case 100, whether the earbud case 100 is currently charging, whether the first or second earbuds are currently charging, or some other state or configuration of the earbud case 100. In one implementation, the one or more light indicators 520 may be disposed on the curved top 106. As an example, a first light indicator 520 may include a light that illuminates when the earbud case 100 is on and does not illuminate when the device is off. A second light indicator 520 may illuminate when the earbud case 100 is charging and may not illuminate when the device is not charging. A third light indicator 520 may illuminate when the first or second earbuds are charging and may not illuminate when the first or second earbuds are not charging.

The circuit board 500 may also include a power management subsystem 522. The power management subsystem 522 may be connected to the electrical contacts 130 and may be configured to charge the first and second earbuds when placed inside the first chamber 118 and second chamber 120. The power management subsystem 522 may also be configured to charge the battery when connected to a power source.

The power management subsystem 522 may include a battery protection integrated circuit (IC) 524. The battery protection IC 524 may be configured to provide overcharge and high-temperature protection to the battery during charging by discharging the battery or stopping the battery from charging. The power management subsystem 522 may also include a linear battery charger 526. The linear battery charger 526 may be configured to maintain a consistent output voltage to the battery during charging. The linear battery charger may be a linear Li-ion battery charger. The power management subsystem 522 may also include one or more metal-oxide-semiconductor field effect transistors (MOSFETs) 528. The one or more MOSFETs 528 may be configured to facilitate charging and discharging of the battery. MOSFET 528 may be a dual N-channel MOSFET.

The circuit board 500 may include memory (not depicted). The memory may include volatile memory or non-volatile memory. The memory may include read-only memory (ROM), flash memory, dynamic random-access memory (DRAM), such as synchronous DRAM (SDRAM), double data rate (DDR) SDRAM, static random-access memory (SRAM), or some other type of memory.

Figure 6:
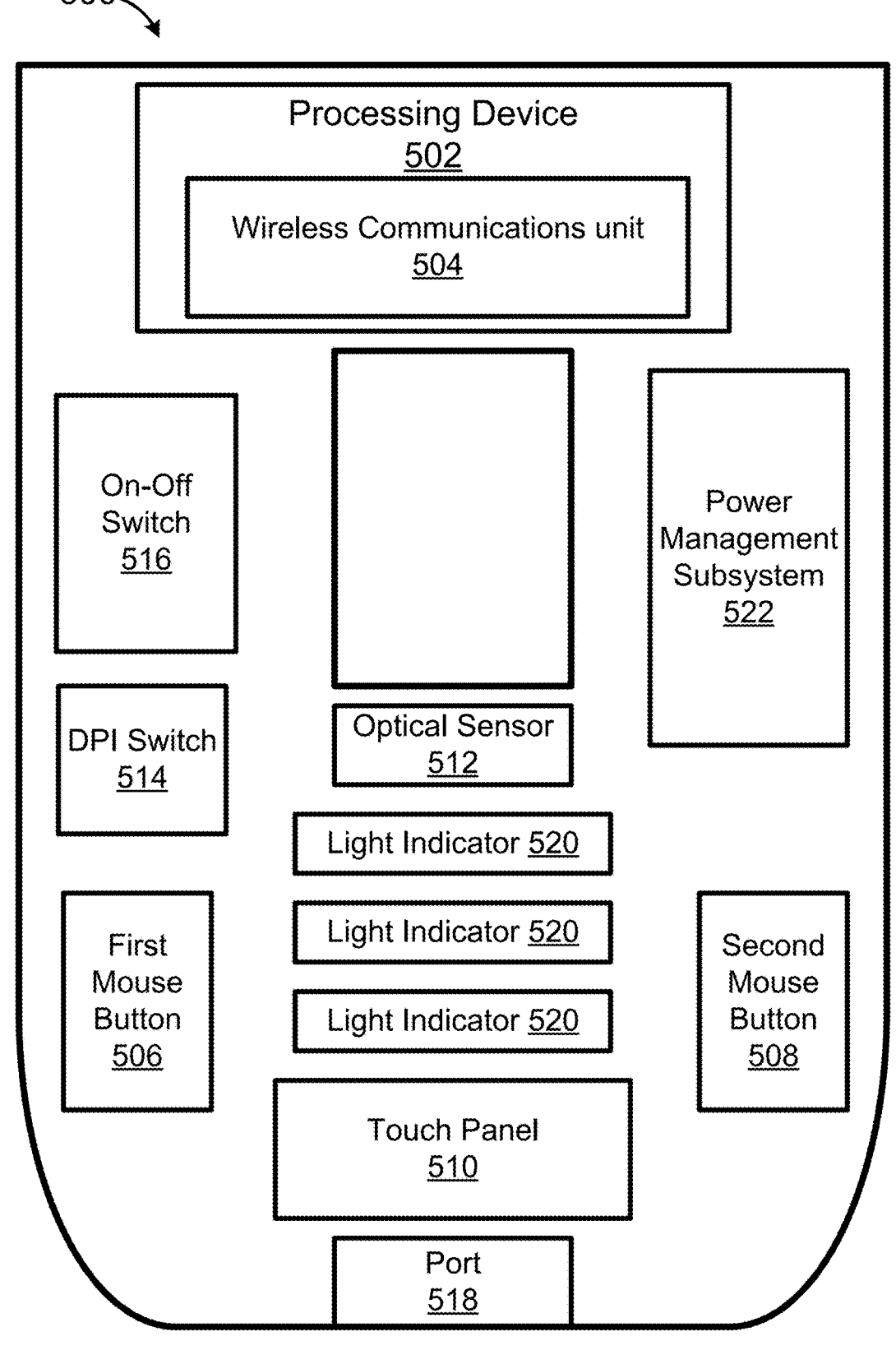
FIG. 6 is a schematic block diagram illustrating an example embodiment of a printed circuit board (PCB) layout by which selected aspects of the present disclosure may be implemented, in accordance with various embodiments.

FIG. 6 depicts an example block schematic of a printed circuit board (PCB) 600 implementation of the circuit board 500 of FIG. 5. The port 518 may be placed along an outside edge of the PCB 600 to allow a cord or a USB or the like to be plugged into the port 518. The on-off switch 516 and the DPI switch 514 may also be placed along an outside edge of the PCB 600 to allow the physical components to extend past the edge and protrude through slots formed on the sides of the earbud case 100, such as the on-off slot 802 depicted in FIG. 8.

FIG. 7 depicts a perspective view of the PCB 600 with an overlay of the earbud case 100 with the compliant lid 102 removed depicted with the dashed lines. The PCB 600 may extend beneath the first chamber 118 and the second chamber 120. The first mouse button 506 may be disposed beneath first compliant area 132 such that when the curved top 106 is compressed in the first compliant area 132, the first mouse button 506 is activated. The second mouse button 508 may be disposed beneath the second compliant area 134, such that when the curved top 106 is compressed in the second compliant area 134, the second mouse button 508 is activated. The touch panel 510 may be disposed beneath the third area 136, such that when a conductive object contacts the third area 136, the touch panel 510 is activated.

FIG. 8 provides a perspective view of another embodiment of the earbud case 100 with the compliant lid 102 removed. The earbud case 800 may include light indicators 520 disposed on the curved top 106 surface to convey information about the earbud case 100, such as charging status, battery level, or more. An on-off slot 802 may be formed on the side of the earbud case 100 to accommodate an actuator protruding through the on-off slot 802, such as the on-off switch 516 or the DPI switch 514.

Figure 9:
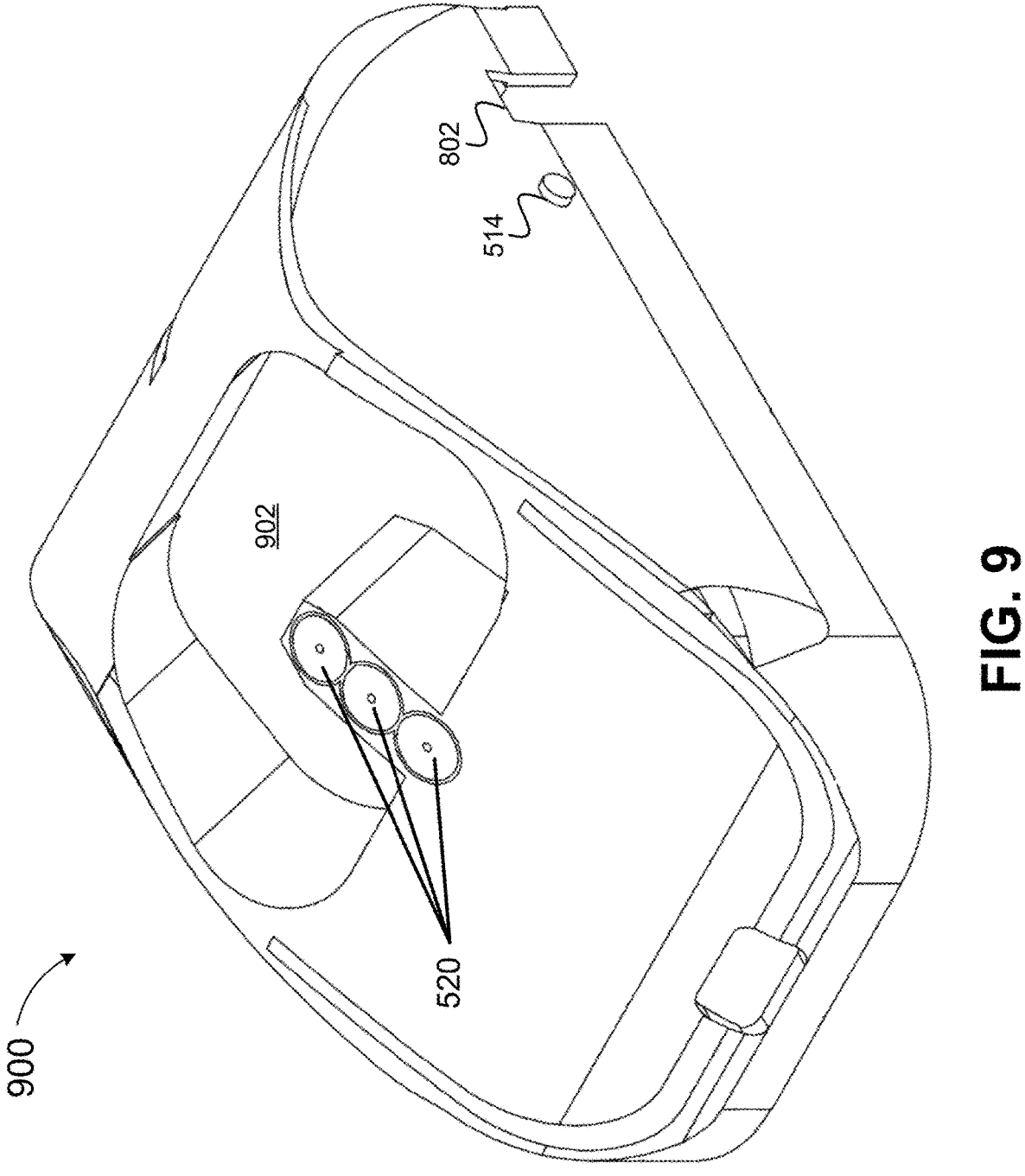
FIG. 9 is a perspective view of an example embodiment of an earbud case in accordance with various embodiments.

FIG. 9 provides a perspective view of another embodiment of the earbud case 100 with the compliant lid 102 removed. The earbud case 900 may include a first portion 114 with an open section 902 in place of the first chamber 118 and second chamber 120. The open section 902 may be configured to receive a pair of earbuds. The open section 902 may be configured to accommodate earbuds of different shapes than the first and second earbuds. The open section 902 may contain electrical contacts like electrical contacts 130. The open section 902 may charge an earbud when the earbud is inserted into the open section 902. The open section 902 may accommodate a first pair of earbuds or a second pair of earbuds that have earbuds of different shapes than the first pair of earbuds.

The open section 902 may be configured to accommodate sockets that are insertable to the open section 902. The sockets may contain electrical contacts that insert into the electrical contacts like electrical contacts 130 in the open section 902. The sockets may be configured to house a wireless earbud of a specific shape. The sockets may be configured to charge an earbud housed in the socket when the socket is inserted into the open section 902. The sockets may plug into the open section 902 to form a first and second earbud chamber. A first socket housing one shape of earbud may be inserted into one side of the open section 902 and a second socket housing another shape of earbud may be inserted into the other side of the open section 902. The first and second sockets may accommodate earbud shapes that are different from the shapes of the first and second earbuds.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure. Furthermore, the components of the earbud case 100 are example components, and other components or configurations may be used.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "providing", "sending", "adjusting", "determining", "playing", or the like, may refer to the actions and processes of a microprocessor, a computing device, or a similar electronic device, that manipulates and transforms data represented as physical (e.g., electronic) quantities within the computer system's registers and memories into other data similarly represented as physical quantities within the computer system memories or registers or other such information storage, transmission or display devices.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion. Use of the term "a" or "an" include "one or more" unless otherwise specified.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like may refer to a computer-related entity, either hardware (e.g., a circuit), firmware, software, a combination of hardware and software, or an entity related to an operational machine with one or more specific functionalities. For example, a component can be, but is not limited to being, a process running on a processing device, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An earbud case comprising:
   a body having a curved top surface and a flat bottom, wherein the curved top surface comprises:
   a mouse button;
   a section configured to receive a first pair of earbuds, wherein the section is positioned adjacent to the mouse button and configured to charge the first pair of earbuds when placed in the section; and
   a compliant area positioned over the mouse button to activate the mouse button in response to the compliant area being compressed;
   a lid comprising a curved surface having ergonomics of a computer mouse, wherein the lid is configured to:
   slide along a slot formed on the body of the earbud case in a first direction to an open position, exposing the curved top surface; and
   slide along the slot in a second direction to a closed position, covering the curved top surface.

2. The earbud case of claim 1, wherein all active electronic components for the earbud case are disposed in the body of the earbud case.

3. The earbud case of claim 1, wherein the section of the curved top surface comprises a first chamber and a second chamber, wherein the first chamber is configured to receive a first earbud of the first pair of earbuds and the second chamber is configured to receive a second earbud of the first pair of earbuds.

4. The earbud case of claim 1, wherein the section of the curved top surface comprises an open section configured to receive the first pair of earbuds or a second pair of earbuds, wherein the second pair of earbuds comprises earbuds of different shapes than the earbuds of the first pair of earbuds.

5. The earbud case of claim 4, wherein the open section is configured to receive:

a first socket insertable into the open section, wherein the first socket is configured to receive a first earbud of the second pair of earbuds; and a second socket insertable into the open section, wherein the second socket is configured to receive a second earbud of the second pair of earbuds.

6. An earbud system comprising:

an earbud case;

a first earbud; and a second earbud, wherein the earbud case comprises:

a battery;

a circuit board comprising electronics comprising:

a power management sub-system coupled to the battery;

a processing device; and a wireless communications component;

a body having a curved top surface and a flat bottom;

wherein the curved top surface comprises:

a mouse button;

a section positioned adjacent to the mouse button and configured to receive the first earbud and the second earbud, the first earbud and the second earbud to be charged by the power management sub-system when placed in the section; and a compliant area positioned over the mouse button to activate the mouse button in response to the compliant area being compressed;

a lid having a curved surface having ergonomics of a computer mouse, wherein the lid is configured to:

slide along a slot formed on the body of the earbud case in a first direction to an open position exposing the curved top surface; and slide along the slot in a second direction to a closed position to cover the curved top surface.

7. The earbud system of claim 6, wherein the processing device is programmed to:

communicatively couple the earbud case to a host device by the wireless communications component;

transmit wireless communications from the earbud case to the host device by the wireless communications component; and receive wireless communications from the host device by the wireless communications component.

8. The earbud system of claim 6, wherein all active electronic components for the earbud case are disposed in the body of the earbud case.

9. The earbud system of claim 6, wherein the section of the curved top surface comprises a first chamber and a second chamber, wherein the first chamber is configured to receive the first earbud and the second chamber is configured to receive the second earbud.

10. The earbud system of claim 6, wherein the section of the curved top surface comprises an open section, wherein the open section accommodates earbuds of different shapes than the first and second earbuds.

11. An earbud case comprising:

a battery;

a circuit board comprising electronics comprising:

a power management sub-system coupled to the battery;

a processing device; and a wireless communications component;

a compliant lid having a curved surface having ergonomics of a computer mouse; and a body having a curved top and a flat bottom, wherein the body is divided into a first portion and a second portion, wherein:

the first portion is located on the curved top and comprises:

a first chamber having electrical contacts coupled to the power management sub-system, the power management sub-system to charge a first earbud when placed in the first chamber; and a second chamber having electrical contacts coupled to the power management sub-system, the power management sub-system to charge a second earbud when placed in the second chamber; and the second portion is located on the curved top and extends beneath the first portion and comprises:

a first mouse button, wherein the first mouse button is activated by compression of the compliant lid and the curved top in a first area of the compliant lid and a corresponding compliant first area of the curved top above the first mouse button;

a second mouse button wherein the second mouse button is activated by compression of the compliant lid and the curved top in a second area of the compliant lid and a corresponding compliant second area of the curved top above the second mouse button; and a touch panel, wherein the touch panel is activated by a presence of a conductive object in a third area of the compliant lid and a corresponding third area of the curved top above the touch panel.

12. The earbud case of claim 11, wherein the compliant lid comprises:

a magnet to maintain the compliant lid in a closed position; and a guide insertable to a slot on the curved top, wherein the guide allows the compliant lid to slide along the slot on the curved top to an open position that allows access to the first and second chambers.

13. The earbud case of claim 11, wherein the curved top comprises a compliant region coupling the corresponding compliant first area of the curved top and the corresponding compliant second area of the curved top to the flat bottom, allowing the compliant first and second areas of the curved top to travel and activate the first and second mouse buttons when compressed.

14. The earbud case of claim 11, wherein the touch panel comprises a plurality of electrodes, wherein the touch panel is configured to:

detect the presence of a conductive object; and track a motion of the conductive object.

15. The earbud case of claim 11, wherein all active electronic components for the earbud case are disposed in the second portion of the body of the earbud case.

16. The earbud case of claim 11, wherein the processing device includes the wireless communications component, wherein the processing device is programmed to:

communicatively couple the earbud case to a host device by the wireless communications component;

transmit wireless communications from the earbud case to the host device by the wireless communications component; and receive wireless communications from the host device by the wireless communications component, wherein the wireless communications received from the host device comprises audio data for the first or second earbuds to transmit with speakers in the first or second earbuds.

17. The earbud case of claim 16, wherein the wireless communications comprises at least one of:

a command to move a cursor on a screen of the host device in a direction corresponding to a direction of movement of the earbud case;

a command to execute a left click with the cursor on the screen of the host device in response to the first mouse button being activated;

a command to execute a right click with the cursor on the screen of the host device in response to the second mouse button being activated; or a command to scroll contents of a window on the screen of the host device in a direction that corresponds with a direction of motion of a conductive object in the third area of the compliant lid and the corresponding third area of the curved top.

18. The earbud case of claim 11, wherein the processing device is programmed to:

enter a low-power mode if the first mouse button, the second mouse button, or the touch panel has not been activated for a predetermined period of time; and exit the low-power mode if the first mouse button or the second mouse button is activated.

19. The earbud case of claim 11, wherein the first portion comprises an open section, wherein the open section accommodates earbuds of different shapes than the first and second earbuds.

20. The earbud case of claim 19, wherein the open section is configured to receive:

a first socket insertable into the open section; and a second socket insertable into the open section, wherein the first and second sockets accommodate earbud shapes different from the first and second earbuds.

\* \* \* \* \*